(12) United States Patent
Miner

(10) Patent No.: US 7,063,791 B2
(45) Date of Patent: Jun. 20, 2006

(54) PUMP INLET SCREEN

(76) Inventor: Daniel P. Miner, 4330 S. Center, Casper, WY (US) 82601

(*) Notice: Subject to any disclaimer, the term of this patent is extended or adjusted under 35 U.S.C. 154(b) by 206 days.

(21) Appl. No.: 10/894,733

(22) Filed: Jul. 20, 2004

(65) Prior Publication Data

US 2006/0016744 A1    Jan. 26, 2006

(51) Int. Cl.
- B01D 27/14 (2006.01)
- B01D 29/17 (2006.01)
- B01D 29/58 (2006.01)
- F04B 39/16 (2006.01)

(52) U.S. Cl. ............ 210/416.1; 210/315; 210/460; 210/489; 55/511

(58) Field of Classification Search ........... 210/314, 210/315, 416.1, 459, 416.2, 460, 416.3, 483, 210/416.4, 488, 416.5, 489; 55/485, 497, 55/499, 511; 166/227–236
See application file for complete search history.

(56) References Cited

U.S. PATENT DOCUMENTS

| | | | |
|---|---|---|---|
| RE20,432 E | | 6/1937 | Roberts .................. 210/380.1 |
| 2,910,183 A | | 10/1959 | Hayes ........................ 210/315 |
| 3,216,505 A | * | 11/1965 | Johansson ................ 166/230 |
| RE29,447 E | | 10/1977 | Farrow et al. ............. 210/232 |
| 4,358,371 A | | 11/1982 | Jameson et al. ........... 210/415 |
| 4,378,840 A | * | 4/1983 | Lilly ......................... 166/233 |
| 4,601,821 A | * | 7/1986 | Sherman et al. ........... 210/169 |
| 4,767,426 A | | 8/1988 | Daly et al. .................... 55/487 |
| 5,118,421 A | | 6/1992 | Scarano ..................... 210/485 |
| 5,824,232 A | | 10/1998 | Asher et al. ............... 210/787 |
| 5,873,999 A | | 2/1999 | Gaiser ........................ 210/488 |
| 6,024,229 A | * | 2/2000 | Ayers ........................ 210/443 |
| 6,481,580 B1 | * | 11/2002 | Amstutz et al. ............ 210/440 |
| 6,491,818 B1 | | 12/2002 | Dwyer et al. .............. 210/315 |
| 6,524,411 B1 | | 2/2003 | Pulek et al. ................. 156/69 |
| 6,555,000 B1 | * | 4/2003 | Knight .................... 210/416.4 |

FOREIGN PATENT DOCUMENTS

| | | | |
|---|---|---|---|
| JP | 0. 57-30517 | * | 2/1982 |
| JP | 63-283712 | * | 11/1988 |
| JP | P2001-145811 | * | 5/2001 |
| SU | 1084486 | * | 4/1984 |

* cited by examiner

Primary Examiner—Fred G. Prince
(74) Attorney, Agent, or Firm—Alfred J. Mangels

(57) ABSTRACT

A pump inlet screen for a submersible pump adapted to be inserted into a well bore. The screen includes an inner support sleeve having openings therethrough and an outer mesh screen member that overlies the out surface of the inner support sleeve. A polymer coated reinforcing ring is secured to one end of the screen and includes spaced, radially-extending threaded openings for receiving set screws to permit securement of the inlet screen to the outer surface of a cylindrical housing. The opposite end of the inlet screen from the reinforcing ring includes a sealing ring having an inwardly-extending, sloping lip seal to engage the outer surface of a cylindrical housing.

16 Claims, 3 Drawing Sheets

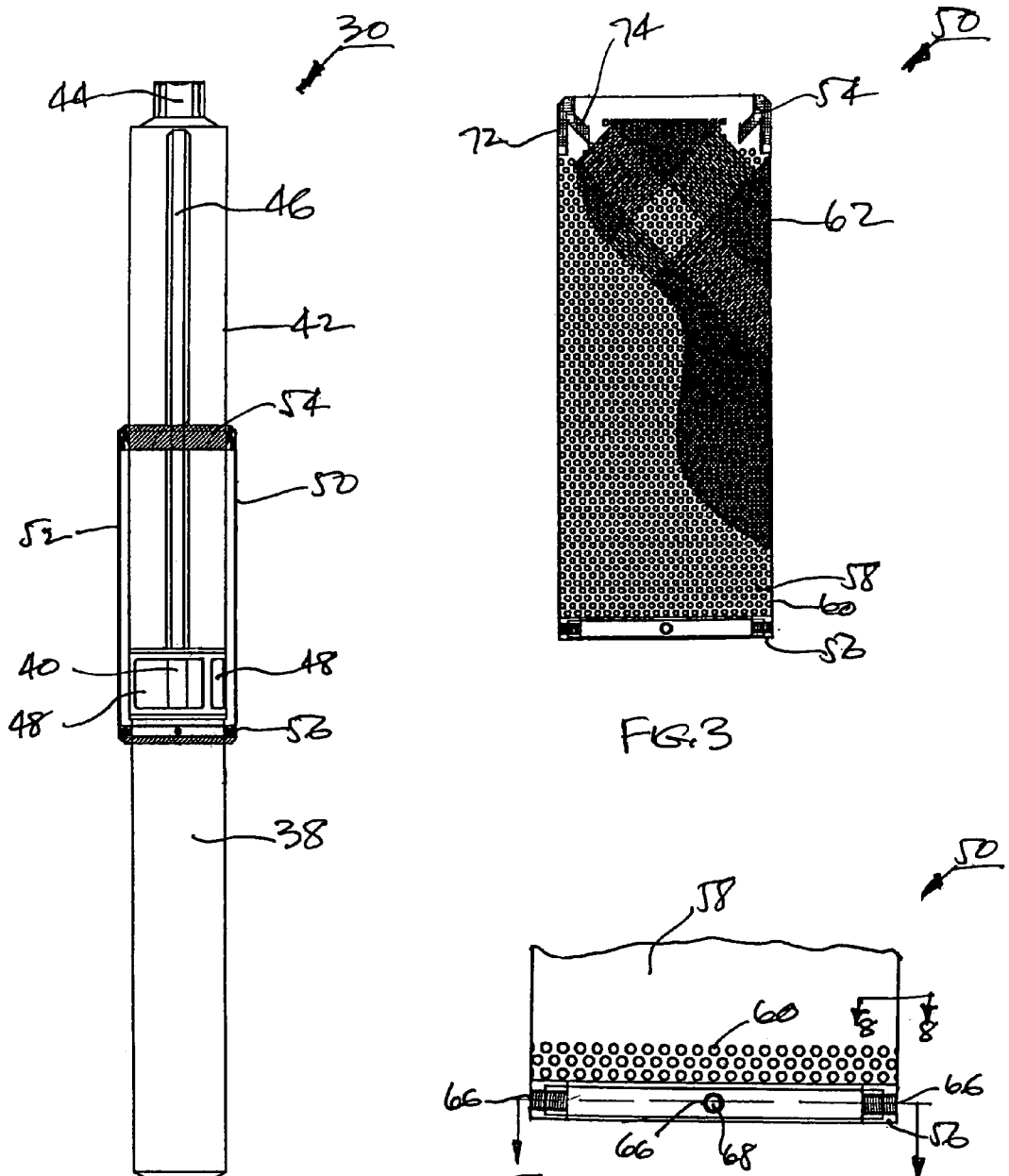

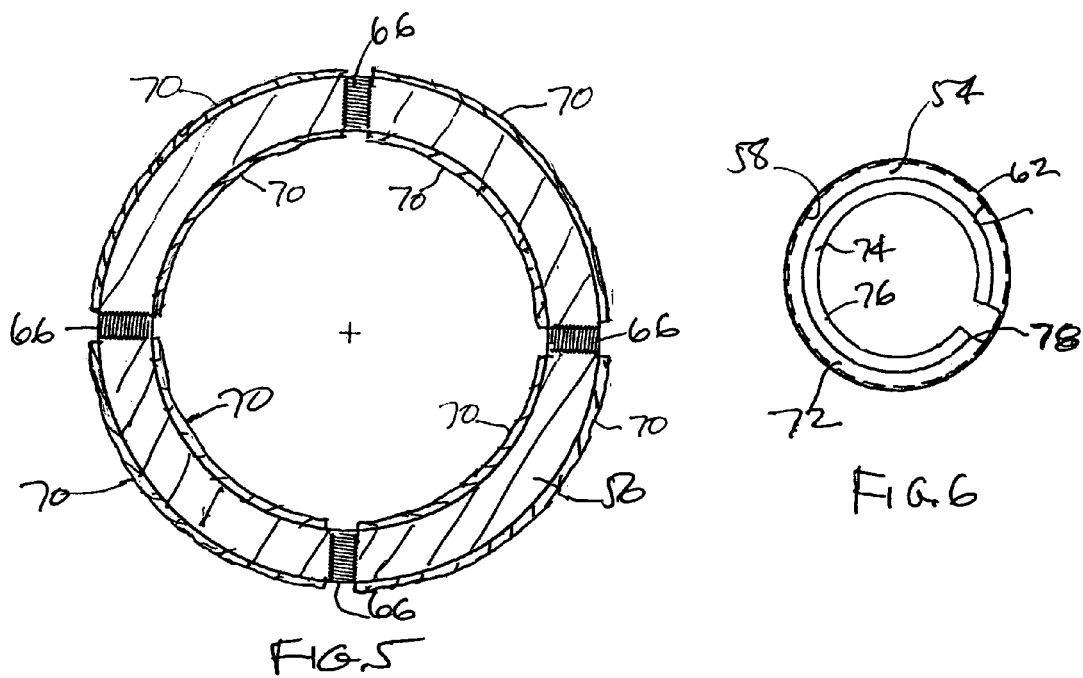
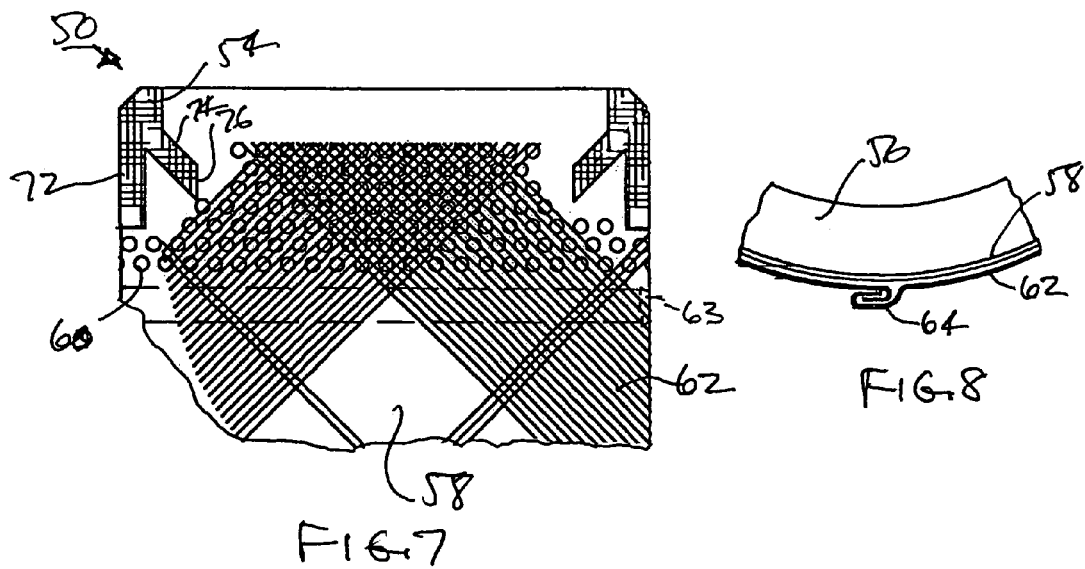

PUMP INLET SCREEN

BACKGROUND OF THE INVENTION

1. Field of the Invention

The present invention relates to an inlet screen assembly for the inlet of a pump for pumping liquids. More particularly, the present invention relates to a tubular inlet screen assembly that is adapted to be received over a tubular pump suction inlet, through which inlet flow of a liquid into the pump takes place in a generally radial direction relative to the pump suction tube axis.

2. Description of the Related Art

Inlet screens or filters of various forms are frequently utilized to prevent the entry through the inlet of a liquid pump of particulate matter that could enter into the interior of the pump and possible cause internal damage. For example, in submersible pumps that are utilized to pump liquids from a borehole in the ground, screens are provided at the pump suction inlet to block the entry of large particles of rock or other hard materials into the interior of the pump. Such screens have openings that have a size that is selected based upon the smallest size particles that are to be blocked from entering the pump housing. Some pumps include screens that are fixed to the pump inlet by the pump manufacturer. Oftentimes pump inlet screens are designed and constructed to fit only a given size pump inlet structure, thereby requiring a different screen component for each pump.

Particulate-blocking-screens are especially necessary to protect the interior components of submersible pumps that are utilized in pumping underground water or other submerged liquids. One common application of a submersible pump is in connection with the pumping of water from underground coal bed methane gas wells. In that regard, underground coal seams are often saturated with water, and the pressure of the water operates to confine the methane gas within the coal seam and hampers its recovery. Accordingly, submersible liquid pumps are needed to pump large volumes of water from below the ground to release the water pressure that traps the methane gas within the coal seam, and thereby facilitate the recovery of the trapped methane gas. Typically, submersible pumps operating in such wells have multiple, sequentially arranged impellers and can pump from about 5 to about 20 gallons of water per minute. And as the subterranean water pressure is reduced as a result of the removal of water from the well, the methane gas is liberated and migrates toward the well bore, where it can be collected and brought to the surface.

In operating submersible pumps in underground coal bed methane wells, it is necessary to provide screens over the pump inlets in order to prevent the entry into the pump of abrasive materials, such as rock and coal particles. Because of their hardness, such particles can cause rapid wear of the pump internal parts, including the impellers and shaft bearings, and they can also degrade the effectiveness of internal seals. As a result, the pump operating efficiency is reduced and removal and replacement of the entire pump is required to maintain the desired pumping rate, or, alternatively, the removal and repair of the pump, in either case resulting in undesirable pump and well downtime. In that regard, commonly utilized screen structures for such submersible pumps generally are in the form of punched plates having circular openings of a size to prevent the entry into the pump interior of rock or coal particles that are greater than a predetermined size and that could cause damage to, such parts as the pump impeller. However, such punched plates often limit the pump flow rate because the circular opening pattern provides a relatively small open area of the overall plate surface. Additionally, such punched plate inlet screen structures are commonly affixed to the pump structure by the pump manufacturer, such as by the use of pop rivets, or the like, and are therefore not interchangeable or adapted to fit other pump suction tube sizes.

There is therefore a need for an pump inlet screen structure for a submersible pump to block the entry into the pump housing of smaller size particles, without unnecessarily restricting pump flow, and that is easily removable and replaceable, and that also is so configured that it can be utilized on pumps having somewhat different suction tube diameters.

SUMMARY OF THE INVENTION

Briefly stated, in accordance with one aspect of the present invention, a pump inlet screen is provided having an inner annular support sleeve with a plurality of openings to allow liquid to pass radially therethrough. An outer screen member overlies an outer surface of the support sleeve, the outer screen member including a plurality of openings having an opening size small than the openings in the support sleeve. A rigid reinforcing ring is positioned at one longitudinal end of the inlet screen, the reinforcing ring including securement means for securing the inlet screen in a desired position along a tubular pump body having a suction opening, and so that the inlet screen overlies the suction opening to limit the sizes of particles that can pass therethrough. A flexible sealing ring is positioned at an opposite longitudinal end of the inlet screen for blocking flow between the end of the inlet screen and the tubular body member.

BRIEF DESCRIPTION OF THE DRAWINGS

The structure, operation, and advantages of the present invention will become further apparent upon consideration of the following description, taken in conjunction with the accompanying drawings in which:

FIG. 2 is an elevational view of a submersible pump including an embodiment of an improved pump inlet screen structure with a portion of the inlet screen assembly broken away to expose the pump inlet;

FIG. 3 is an enlarged, elevational view of the pump screen assembly shown in FIG. 2, with parts broken away to show the various components of the screen;

FIG. 4 is an enlarged, fragmentary longitudinal cross-sectional view of the lower portion of the pump screen assembly shown in FIGS. 2 and 3;

FIG. 5 is a cross-sectional, top view of a pump screen reinforcing ring carried by the pump screen assembly shown in FIGS. 2 and 3;

FIG. 6 is a top view of the upper sealing element shown in FIG. 3;

FIG. 7 is an enlarged, fragmentary elevational view at the uppermost portion of the pump screen assembly shown in FIGS. 2 and 3, partially broken away to show in cross section the configuration of an upper seal element; and FIG. 8 is a fragmentary view of the screen structure taken along the line 8—8 of FIG. 4.

DESCRIPTION OF THE PREFERRED EMBODIMENTS

Figure 1:
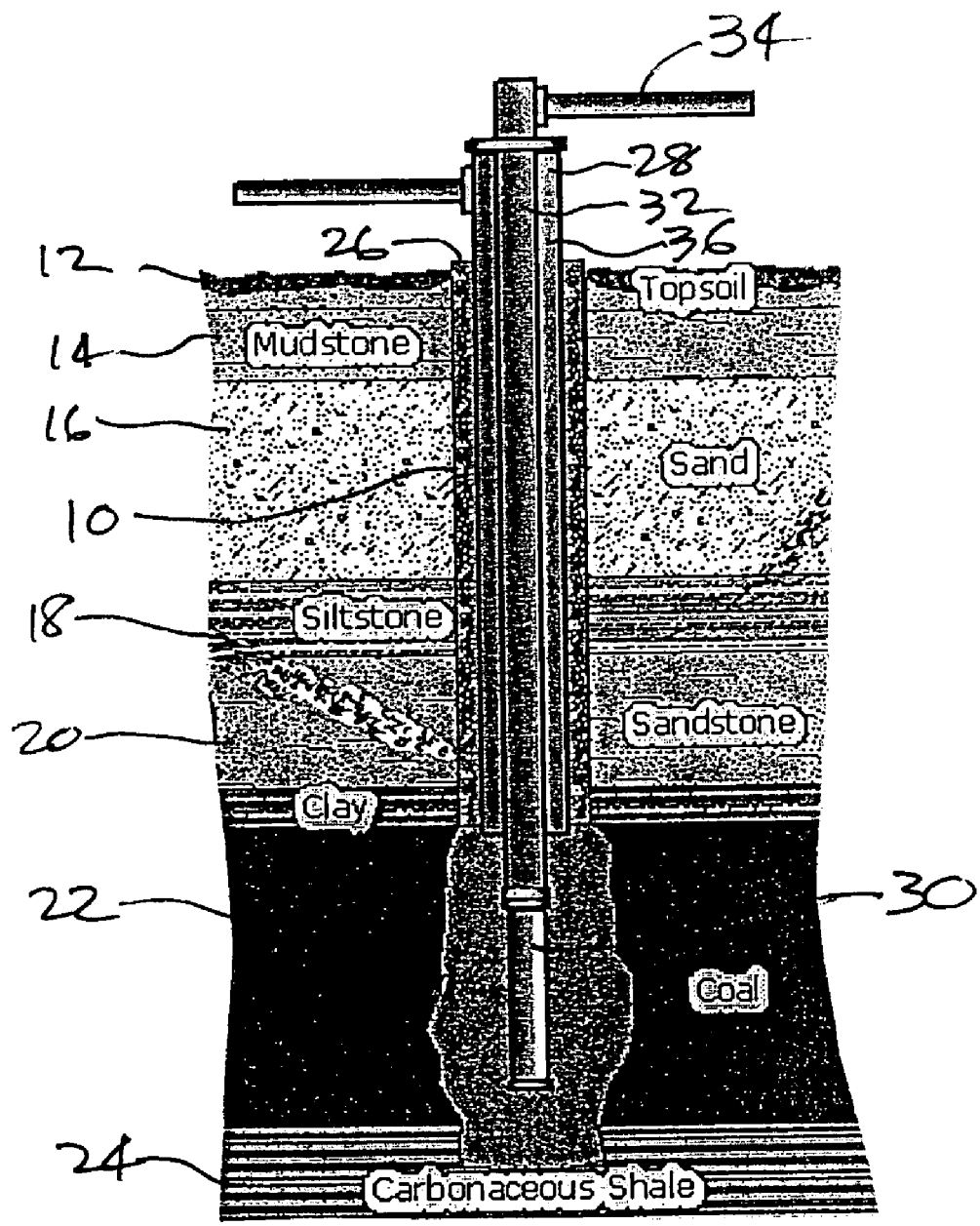
FIG. 1 is an elevational view of a section through a typical coal bed methane well that includes a submersible pump that forms part of a coal bed methane recovery system.

Referring now to the drawings, and particularly to FIG. 1 thereof, there is shown a section through a typical coal bed methane well. A borehole 10 extends into the earth through successive layers. From the surface downward, the layers include topsoil 12, mudstone 14, sand 16, siltstone 18, sandstone clay 20, and a coal vein 22, below which is generally carbonaceous shale 24. A cement casing wall 26 is provided within borehole 10, and a tubular casing pipe 28 is positioned within cement casing wall 26. A submersible pump 30 is lowered into casing pipe 28 to lie in water that is contained in coal vein 22. Pump 30 has an outlet that is connected with a water outlet line 32 that extends to the surface to convey water that is pumped from borehole 10 to a water collector pipe 34. Pump 30 and outlet line 32 each have an outer diameter that is smaller than the inner diameter of casing pipe 28, to form with casing pipe 28 an annular passageway 36 through which the liberated methane gas can flow to the surface to be collected.

Submersible pump 30 is shown in an elevational view in FIG. 2. A cylindrical pump motor housing 38 is provided within which an electric motor (not shown) is received for providing rotational power to rotatably drive a pump drive shaft 40 to which one or more impellers (not shown) are connected. A cylindrical pump outer housing 42 is coaxially connected with pump motor housing 38 and terminates at its uppermost end at a pump outlet connection 44 that communicates with collector pipe 34 shown in FIG. 1. Carried on the outer surface of pump outer housing 42 is a power cable guard sleeve 46 within which an electrical power cable (not shown) is housed and which provides electrical power from a surface source of electrical power to the pump motor.

Pump outer housing 42 includes a plurality of circumferentially-positioned pump suction inlet openings 48. Water drawn by the pump impellers from the coal bed enters pump 30 through inlet openings 48 and then flows upwardly to and through pump outlet 44 and casing pipe 28 into water collector pipe 34 at the surface for collection and possible treatment to render the water suitable for a particular use.

Positioned around pump inlet openings 48 is a pump screen assembly 50, the structure of which is shown in greater detail in FIGS. 3 through 8. Screen assembly 50 is a tubular member that includes a cylindrical screen body 52, an annular sealing element 54 at a first, upper end to contact and engage with pump outer housing 42, and an annular support ring 56 at a second, lower end spaced from the upper end.

As shown in FIG. 3, the structure of screen body 52 includes an inner tubular support sleeve 58 that includes a plurality of spaced openings 60, which can be of circular form, as can be seen more clearly in FIGS. 4 and 7, or they can be of another form, if desired. Support sleeve 58 can be formed from stainless steel sheet, for corrosion resistance, and can have a wall thickness of from about 0.028 in. to about 0.120 in. to provide a support structure for an overlying outer mesh screen 62. Openings 60 in support sleeve 58 when of circular form can have a diameter of the order of from about 1/16 in. to about 1/4 in. Whether of circular or of non-circular form, however, the open area in support sleeve 58 defined by openings 60 can advantageously be of the order of from about 25% to about 35% of the total surface area of support sleeve 58, to provide a sufficient flow area for the anticipated flow rate of water drawn through screen assembly 50 by pump 30. Additionally, openings 60 can be circumferentially aligned in a series of transverse rows, as shown in FIGS. 3, 4, and 7, and adjacent transverse rows can be circumferentially offset from each other to enable the openings to be positioned to provide the desired support sleeve open area.

Outer mesh screen 62 is shown in FIGS. 3 and 7. Mesh screen 62 is also made from stainless steel and is formed from interwoven wire strands to define a multiplicity of substantially square mesh openings. A suitable screen structure is a standard wire mesh screen having a mesh size of from about 40 mesh to about 150 mesh, depending upon the desired flow area and the maximum particle size to be allowed to pass therethrough. As also shown in FIGS. 3 and 7, the wire strands defining mesh screen 62 can be disposed to run in a helical direction against and around the outer surface of support sleeve 58 and relative to the longitudinal axis of the support sleeve.

Outer mesh screen 62 can be initially provided in flat sheet form and can be wrapped around the outer surface of support sleeve 58 to completely overlie that surface. The axially-extending ends of the side edges of mesh screen 62 are connected by an overlap seam 64 as shown in FIG. 8. Each side edge of mesh screen 62 is folded over onto itself to provide respective U-shaped ends that are joined together in interlocking fashion as shown, and they can be secured together by spot welding, or the like, to provide an interlocking, axially-extending seam in mesh screen 62.

The screen openings provided in outer mesh screen 62 are advantageously of substantially square cross section, as compared with other, commercially-available screens that generally have slotted, vee-type openings. The square openings provide a uniform size in each direction of the opening, rather than an opening that is larger in one direction than in the other. As a result, the square opening can be about 0.060 in. by about 0.060 in., whereas a vee-type screen is 0.060 in. in one direction and is an elongated slot in the other, perpendicular direction. Consequently, a particle having a size of 0.060 in. in width by 0.200 in. in length could more readily pass through the conventional, vee-type screen opening, but it would be blocked by the 0.060 in. by 0.060 in. square cross section screen. Such particle shapes are not uncommon in coal bed methane wells, and because they pass through the conventional screen structures they frequently lead to the need for earlier replacement of pump internal components.

The structure of support ring 56 is shown in FIGS. 3, 4, and 5. Support ring 56 is an annular member that also is formed from stainless steel, for rigidity. A series of three, four, or more equally circumferentially spaced, threaded radial openings 66 are provided to receive respective set screws 68, the inner ends of which are adapted to engage the outer surface of motor housing 38 to hold pump screen assembly 50 in the desired position so that it overlies each of pump suction inlet openings 48. Support ring 56 is secured to an end of support sleeve 58 by welding.

After joining together support ring 56 and support sleeve 58, the outer surfaces of support ring 56 are provided with an outer coating 70 of a flexible, polymeric material, such as polyurethane. One type of polyurethane that is suitable for that purpose is commercially known as VIBRATHANE™, and is available from Uniroyal/Compton, of Philadelphia, Pa. In that regard, the end of the screen structure that includes support ring 56 and that fits over the motor casing can be coated with VIBRATHANE™ B-601 TDI Polycaprolactone polyether urethane having a hardness of about 95 Shore A durometer. Similarly, the opposite, free end of the screen structure can be coated with VIBRATHANE™ B-6060 TDI high performance polyether urethane having a hardness of about 62 Shore A fits over the motor casing can be coated B-601 durometer. The thickness of outer coating 70 on the radially outward surface of support ring 56 and on the lower ends of support sleeve 58 and mesh screen 62 can be of the order of from about 1/8 in. to about 2.0 in., and the thickness of outer coating 70 on the radially inward surface support sleeve 58 and of support ring 56 can be of the order of from about 1/8 in. to about 1.0 in. Outer coating 70 serves as a protective layer for support ring 56, and it also serves to provide a flexible seal area between the lower end of screen assembly 50 and the outer surface of pump motor housing 38. The seal provided by the contact of outer coating 70 with the outer surface of pump motor housing 38 serves to prevent bypass flow of water and material between screen assembly 50 and the pump motor housing 38. Thus, the flow of water and material that flows into pump inlet openings 48 is confined to take place through mesh screen 62, for substantially complete control of the size of the particles that are permitted to enter the pump inlet openings.

Upper sealing element 54 is best seen in FIGS. 3, 6, and 7. Sealing element 54 is also formed from a flexible polymeric material, such as the polyurethane with which support ring 56 is coated, and it is sealingly joined to screen assembly 50 at it upper end, relative to the direction of the longitudinal axis of pump 30, the end opposite from support ring 56. Sealing element 54 includes an annular body 72 and an inwardly-directed lip 74. As shown in FIG. 7, lip 74 is inwardly and downwardly inclined, relative to the longitudinal axis of screen assembly 50, and its innermost end 76 is adapted to flexibly engage the outer surface of pump outer housing 42 to seal the upper end of screen assembly 50, relative to the pump housing, to prevent bypass flow of material therebetween, and thereby confine the flow of water that flows into pump inlet openings 48 to take place through screen body 52 for substantially complete control of the maximum size of the particles that are permitted to enter the pump inlet openings. The flexible nature of sealing lip 74 permits screen assembly 50 to fit against and to adapt to the outer surface diameter of various tubular pump sizes made by different manufacturers of submersible pumps. For example, for a pump screen assembly having a nominal outer diameter of 4 3/4 in. and an inner diameter of 4 in., the innermost end 76 of lip 74 can define a circle having a diameter of about 3 3/8 in., which enables the screen assembly to be utilized on submersible pumps having pump body diameters that range from about 3 1/2 in. to about 4 in.

Also shown in FIG. 7 is an annular, stainless steel support ring 63 that can be spot welded to the inner surface of support sleeve 58. Several such support rings can be provided at intervals of from about 4 inches to about 6 inches in a longitudinal direction of the screen assembly to provide additional support against inward collapse of support sleeve 58 when the pump is in operation. Support rings 63 can have an axial length of about 0.250 in. and a radial thickness of about 0.150 in.

As is shown in FIG. 6, sealing element 54 includes a cable groove 78 that defines a gap to accommodate power cable guard sleeve 46. Additionally, because of the flexibility of sealing element 54, it also provides a seal against the outer surface of cable guard sleeve 46 to block possible bypass flow of water therebetween.

It will be apparent that the disclosed screen structure provides significant improvement over existing structures. In addition to its adaptability to differently-sized pumps, the disclosed structure also provides a square mesh design for improved filtration of particles, to reduce pump damage, and with a significantly greater total open area over other screen designs, such as a vee-type screens.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A pump inlet screen comprising:
   a) an inner annular support sleeve having a plurality of openings to allow liquid to pass radially therethrough;
   b) an outer screen member overlying an outer surface of the support sleeve, the outer screen having a plurality of openings having an opening size smaller than the openings in the support sleeve;
   c) a rigid reinforcing ring positioned at a first longitudinal end of the inlet screen, the reinforcing ring including securement means for securing the inlet screen in a desired position on a tubular pump body having a suction opening and so that the inlet screen overlies the suction opening to limit the sizes of particles that can pass therethrough; and
   d) a flexible sealing ring positioned at a second, opposite longitudinal end of the inlet screen for blocking flow between the second end of the inlet screen and the tubular body member.

2. A pump inlet screen in accordance with claim 1, wherein the inner support sleeve has an open area of from about 25% to about 35%.

3. A pump inlet screen in accordance with claim 1, wherein the outer screen member is a wire mesh.

4. A pump inlet screen in accordance with claim 3, wherein the mesh has a mesh size range of from about 40 mesh to about 150 mesh.

5. A pump inlet screen in accordance with claim 3, wherein the mesh includes substantially square openings.

6. A pump inlet screen in accordance with claim 5, wherein the mesh is defined by crossed wire strands that extend in a helical direction relative to a longitudinal axis of the inner support sleeve.

7. A pump inlet screen in accordance with claim 3, wherein the mesh has a surface open area of from about 30% to about 40% of the screen total surface area.

8. A pump inlet screen in accordance with claim 1, wherein the reinforcing ring is a metallic member.

9. A pump inlet screen in accordance with claim 8, wherein the reinforcing ring includes an outer polymeric coating.

10. A pump inlet screen in accordance with claim 9, wherein the polymeric coating is a polyurethane material.

11. A pump inlet screen in accordance with claim 1, wherein the securement means includes a plurality of radially-extending, circumferentially-spaced threaded openings adapted to receive set screws.

12. A pump inlet screen in accordance with claim 1, wherein the sealing ring is made from a polymeric material.

13. A pump inlet screen in accordance with claim 12, wherein the polymeric material is polyurethane.

14. A pump inlet screen in accordance with claim 1, wherein the sealing ring sealingly engages a longitudinal end of the inlet screen.

15. A pump inlet screen in accordance with claim 1, wherein the sealing ring includes an inwardly-extending lip seal for engagement with an element having a cylindrical outer surface.

16. A pump inlet screen in accordance with claim 15, wherein the lip seal is inwardly inclined relative to a radial plane passing through the sealing ring.

* * * * *